US012572727B2

(12) United States Patent (10) Patent No.: US 12,572,727 B2
Chen et al. (45) Date of Patent: Mar. 10, 2026

(54) STATIC TIMING ANALYSIS METHOD AND STATIC TIMING ANALYSIS SYSTEM

(71) Applicant: REALTEK SEMICONDUCTOR CORP., Hsinchu (TW)

(72) Inventors: Ying-Chieh Chen, Hsinchu (TW); Mei-Li Yu, Hsinchu (TW); Yu-Lan Lo, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 684 days.

(21) Appl. No.: 17/990,799

(22) Filed: Nov. 21, 2022

(65) Prior Publication Data

US 2024/0037306 A1 Feb. 1, 2024

(30) Foreign Application Priority Data

Jul. 27, 2022 (TW) .................................. 111128071

(51) Int. Cl.
　　*G06F 30/3315* (2020.01)
　　*G06F 119/12* (2020.01)
(52) U.S. Cl.
　　CPC ...... *G06F 30/3315* (2020.01); *G06F 2119/12* (2020.01)
(58) Field of Classification Search
　　USPC ....................................................... 716/111
　　See application file for complete search history.

(56) References Cited

U.S. PATENT DOCUMENTS

| | | | |
|---|---|---|---|
| 2003/0229871 A1 | 12/2003 | Nakae et al. | |
| 2016/0217245 A1* | 7/2016 | Gregerson | .......... G06F 30/3312 |
| 2017/0371993 A1* | 12/2017 | Sarrazin | ................. G06F 30/39 |

FOREIGN PATENT DOCUMENTS

TW I31921 B 5/2016

* cited by examiner

*Primary Examiner* — Bryce M Aisaka
(74) *Attorney, Agent, or Firm* — Li & Cai Intellectual Property (USA) Office

(57) ABSTRACT

A static timing analysis method and a static timing analysis system are provided. The static timing analysis methods includes: obtaining a standard cell library file for describing a plurality of standard cells; performing topology mapping on the standard cell library file to find out a target sequential cell from the standard cells, in which the sequential cell includes a logic gate, a selection circuit and a register circuit; executing a logic test process to find out a pin combination that has a mutual non-controllable relationship, and removing timing constraints related to the pin combination that are taken as redundant timing constraints from the standard cell library file, so as to generate an optimized standard library file; and perform a static timing analysis on a target circuit design according to the optimized standard cell library file.

16 Claims, 4 Drawing Sheets

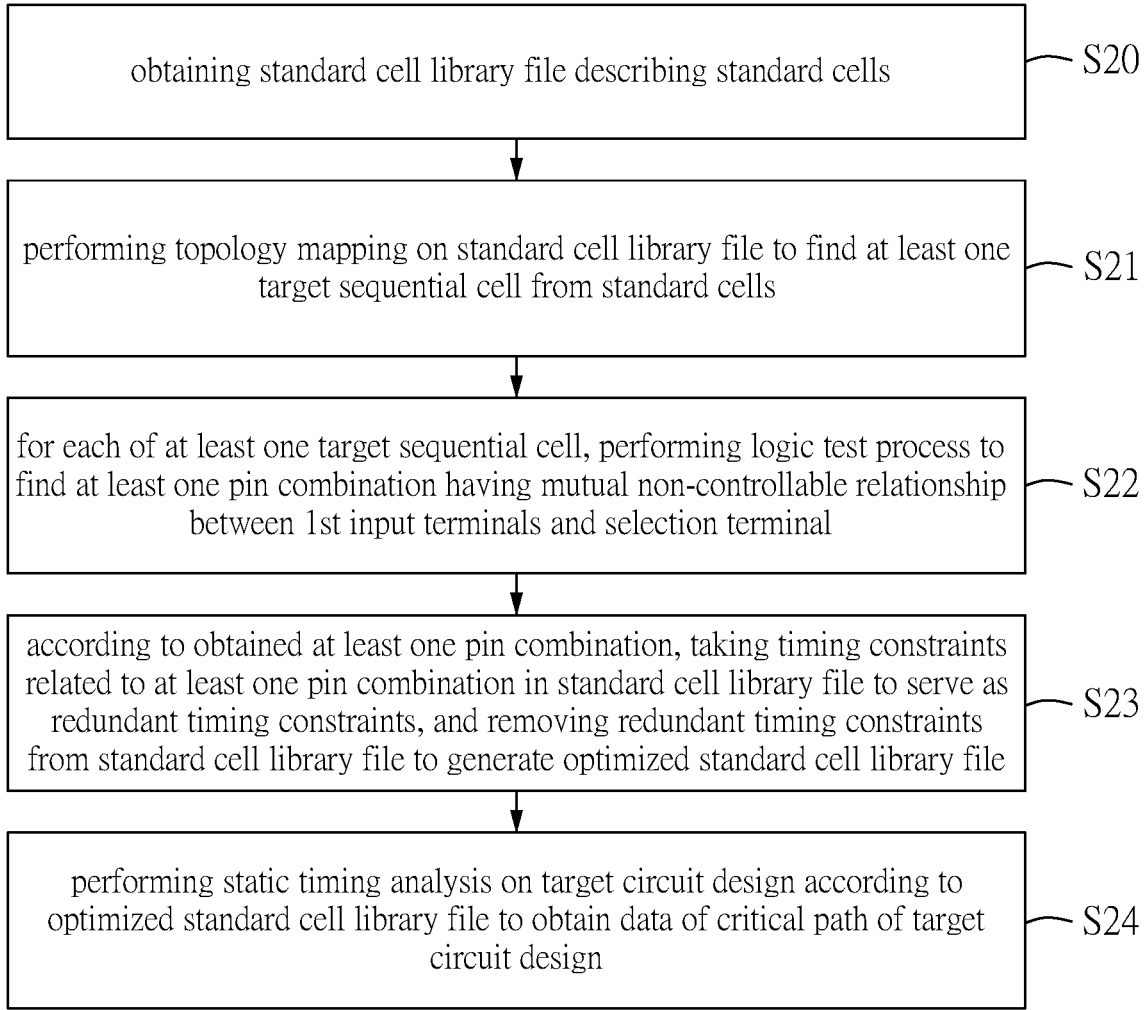

obtaining standard cell library file describing standard cells — S20 performing topology mapping on standard cell library file to find at least one target sequential cell from standard cells — S21 for each of at least one target sequential cell, performing logic test process to find at least one pin combination having mutual non-controllable relationship between 1st input terminals and selection terminal — S22 according to obtained at least one pin combination, taking timing constraints related to at least one pin combination in standard cell library file to serve as redundant timing constraints, and removing redundant timing constraints from standard cell library file to generate optimized standard cell library file — S23 performing static timing analysis on target circuit design according to optimized standard cell library file to obtain data of critical path of target circuit design — S24

FIG. 2

STATIC TIMING ANALYSIS METHOD AND STATIC TIMING ANALYSIS SYSTEM

CROSS-REFERENCE TO RELATED PATENT APPLICATION

This application claims the benefit of priority to Taiwan Patent Application No. 111128071, filed on Jul. 27, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a static timing analysis method and a static timing analysis system, and more particularly to a static timing analysis method and a static timing analysis system that can reduce redundant timing constraints.

BACKGROUND OF THE DISCLOSURE

Static timing analysis (STA) can be used in mass production of integrated circuits (ICs) to evaluate correct operating speeds of chips and to confirm whether the chips can be mass-produced and used properly. However, erroneous STA can affect operations of the chips.

For example, when a chip design is modified to meet false timing constraints in the STA, the performance, power consumption and area (PPA) of the chip may decrease, which affects the competitiveness of the chip and can consume more resources for carrying out modifications to the chip design.

In addition, regardless of whether a computer-aided or manual debug method is being used, only a circuit structure input in the STA can be used to determine whether any redundant timing constraints are caused by pin relationships, which is difficult to find and time-consuming for a standard cell library with thousands of circuits.

SUMMARY OF THE DISCLOSURE

In response to the above-referenced technical inadequacies, the present disclosure provides a static timing analysis method and a static timing analysis system that can reduce redundant timing constraints.

In one aspect, the present disclosure provides a static timing analysis method, which includes: obtaining a standard cell library file describing a plurality of standard cells, in which the standard cell library file defines a plurality of timing constraints associated with the plurality of standard cells; performing topology mapping on the standard cell library file to find at least one target sequential cell from the plurality of standard cells, in which each of the at least one target sequential cell includes a logic gate, a selection circuit and a register circuit, the logic gate has a plurality of first input terminals, and the selection circuit has a selection terminal; for each of the at least one target sequential cell, performing a logic test process to find out at least one pin combination having a mutual non-controllable relationship between the plurality of first input terminals and the selection terminal; according to the obtained at least one pin combination, serving the timing constraints related to the at least one pin combination in the standard cell library file as redundant timing constraints, and removing the redundant timing constraints from the standard cell library file, so as to generate an optimized standard cell library file; and performing a static timing analysis on a target circuit design according to the optimized standard cell library file to obtain data of a critical path of the target circuit design.

In another aspect, the present disclosure provides a timing analysis system for an integrated circuit layout, and the timing analysis system includes a memory and a processor. The memory is configured to store a plurality of computer-executable instructions. The processor is electrically coupled to the memory, and is configured to retrieve and execute the plurality of computer-executable instructions to execute a static timing analysis method that includes: obtaining a standard cell library file describing a plurality of standard cells, in which the standard cell library file defines a plurality of timing constraints associated with the plurality of standard cells; performing topology mapping on the standard cell library file to find at least one target sequential cell from the plurality of standard cells, in which each of the at least one target sequential cell includes a logic gate, a selection circuit and a register circuit, the logic gate has a plurality of first input terminals, and the selection circuit has a selection terminal; for each of the at least one target sequential cell, performing a logic test process to find out at least one pin combination having a mutual non-controllable relationship between the plurality of first input terminals and the selection terminal; according to the obtained at least one pin combination, serving the timing constraints related to the at least one pin combination in the standard cell library file as redundant timing constraints, and removing the redundant timing constraints from the standard cell library file, so as to generate an optimized standard cell library file; and performing a static timing analysis on a target circuit design according to the optimized standard cell library file to obtain data of a critical path of the target circuit design.

Therefore, in the static timing analysis method and the static timing analysis system provided by the present disclosure, circuit elements that need to be corrected due to the redundant timing constraints in previous circuit designs can be effectively located, thereby reducing erroneous detection and repetitive modifications to the circuit designs, thus speeding up a development schedule while providing high reliability and high efficiency.

In addition, a reduction in the performance, power consumption and area (PPA) caused by corrections performed for the redundant timing constraints can be avoided, and costs associated with corrections to the chip design can be saved.

On the other hand, the optimized standard cell library obtained after removing the redundant timing constraints can be available to all circuit designs using the same standard cell library for reuse, making data thereof reusable.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 2 is a flowchart of a static timing analysis method according to one embodiment of the present disclosure;

DETAILED DESCRIPTION OF THE EXEMPLARY EMBODIMENTS

Figure 1:
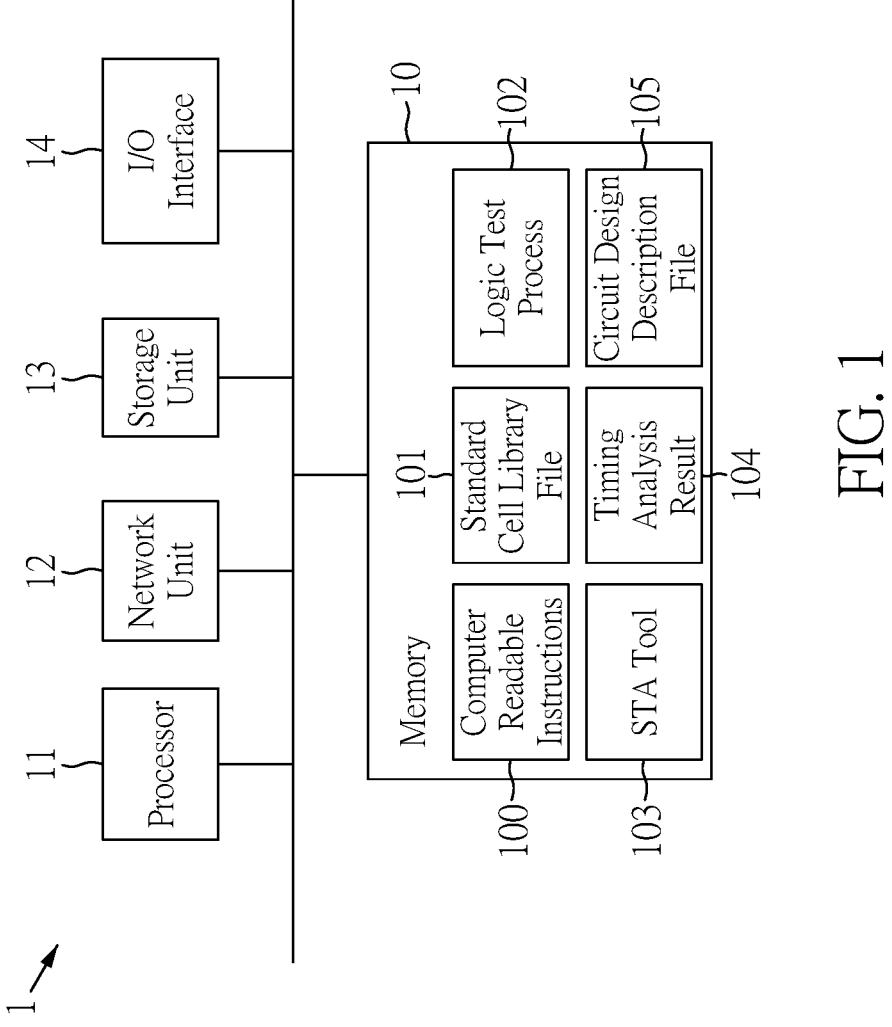
FIG. 1 is a functional block diagram of a static timing analysis system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a functional block diagram of a static timing analysis system according to one embodiment of the present disclosure. Referring to FIG. 1, one embodiment of the present disclosure provides a static timing analysis system 1, which includes a memory 10, a processor 11, a network unit 12, a storage unit 13, and an input/output (I/O) interface 14. The aforementioned elements can communicate with each other through, for example, but not limited to, a bus 15.

The memory 10 is any storage device that can be used to store data, such as, but not limited to random access memory (RAM), read only memory (ROM), flash memory, hard drive disk or other storage device that can be used to store data. The memory 10 is configured to store at least a plurality of computer readable instructions 100. In one embodiment, the memory 10 can also be configured to store temporary data generated when the processor 11 performs operations.

The processor 11 is electrically coupled to the memory 10 and is configured to access the computer-readable instructions 100 from the memory 10 to execute various steps of a static timing analysis method mentioned hereinafter.

The network unit 12 is configured to perform network access under control of the processor 11. The storage unit 13 can be, for example, but not limited to, a magnetic disk or an optical disk to store data or instructions under control of the processor 11. The I/O unit 14 can be operated by a user to communicate with the processor 11 to input and output data.

FIG. 2 is a flowchart of a static timing analysis method according to one embodiment of the present disclosure. FIG. 2 provides a static timing analysis method, which can be applied to the static timing analysis system 1 shown in FIG. 1, or can be implemented by other hardware components such as databases, general processors, computers, servers, or other unique hardware devices with particular logic circuits or apparatus with particular functions, in which, for example, codes and the processors/chips are integrated into a unique hardware. In more detail, the static timing analysis method can be implemented using a computer program to control each element of the static timing analysis system 1. The computer program may be stored in a non-transitory computer-readable storage medium, such as a ROM, the flash memory, floppy disks, the hard disks, the optical disks, flash drives, magnetic tapes, network-accessible databases or a computer-readable recording medium, among others with the same functions, which can be easily contemplated by those skilled in the art.

Referring to FIG. 2, one embodiment of the present disclosure provides a static timing analysis method, which includes the following steps:

Step S20: obtaining a standard cell library file describing a plurality of standard cells. The standard cell library file 101 can be stored in the memory 10, and is used to define a plurality of timing constraints related to the plurality of standard cells.

In detail, the standard cells in the standard cell library can be divided into two categories, one is used to form circuits (such as AND, OR and other components), and the other is used for auxiliary functions in a physical layout of the chip. During circuit design process, the standard cell library provides necessary information for users and integrated circuit design automation software. Generally, the standard cell library includes information such as physical layout, logic, timing and power. The timing information of the standard cell library further includes cell delays and timing constraints.

In order to ensure a correct operation of a circuit component, an input signal of the sequential cell must remain stable for a period of time. The period of time required to maintain stability is regulated by the timing constraints, and the timing constraints play an important role in static timing analysis.

Step S21: performing topology mapping on the standard cell library file to find at least one target sequential cell from the plurality of standard cells.

In detail, this step is to find out a target sequential cell with specific features by circuit inspection through structural analysis, for example, the target sequential cell can be a register circuit with a plurality of input terminals. The reason for choosing this type of register circuit is that, some pins in a circuit structure of the chosen register circuit may have mutual non-controllable relationships, and these pins correspond to certain possible redundant timing constraints.

Figure 3:
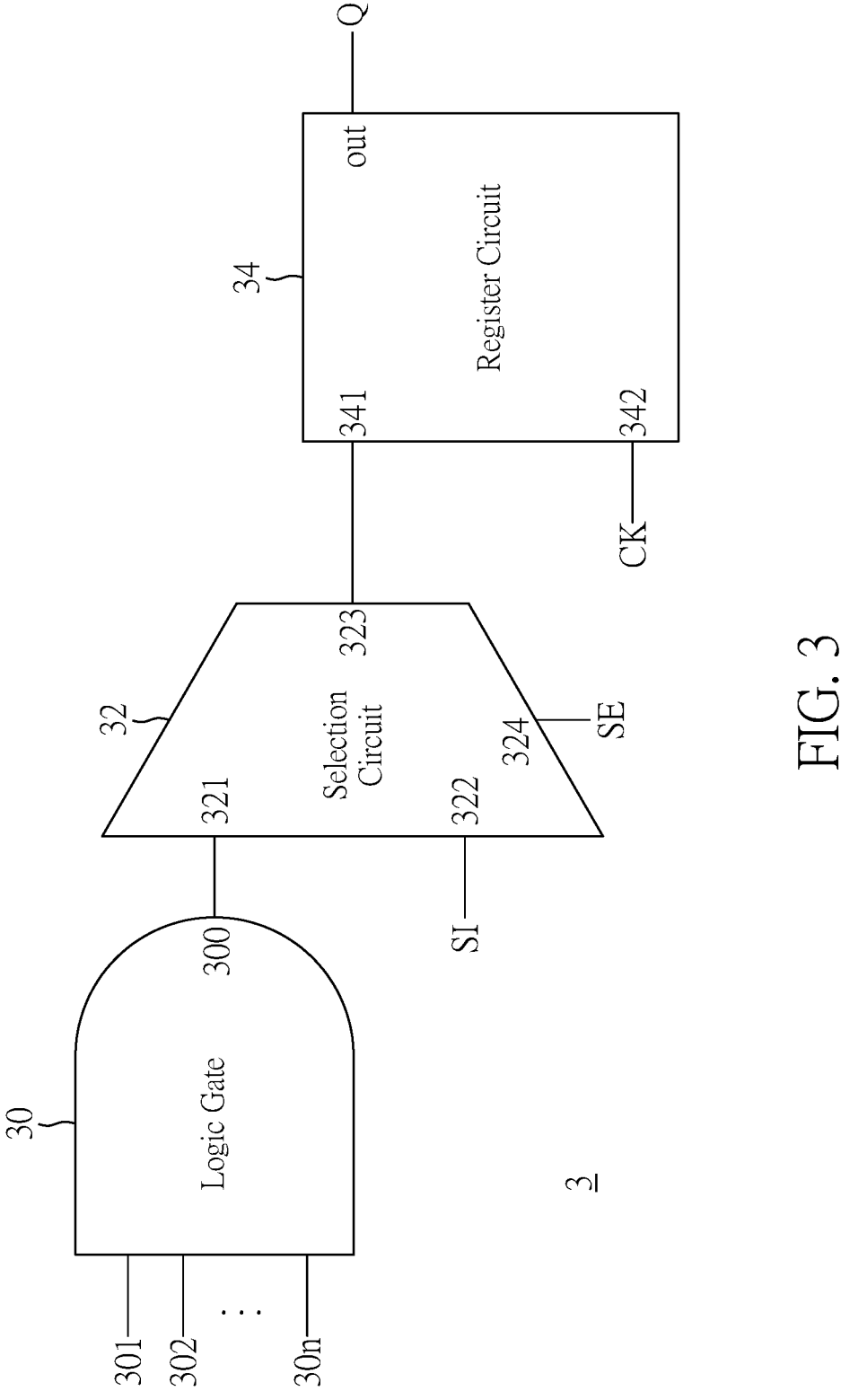
FIG. 3 is a functional block diagram of a target sequential cell according to one embodiment of the present disclosure.

Reference is made to FIG. 3, which is a functional block diagram of a target sequential cell according to one embodiment of the present disclosure. As shown in FIG. 3, the target sequential cell 3 mentioned in this embodiment includes a logic gate 30, a selection circuit 32 and a register circuit 34 that are connected in sequence. The logic gate 30 has first input terminals 301 to 30*n* and a first output terminal 300, the selection circuit 32 has a second input terminal 321, a third input terminal 322, a second output terminal 323 and a selection terminal 324, and the register circuit 34 has a fourth input terminal 341, a clock terminal 342 and an output terminal out.

As shown in FIG. 3, the first output terminal 300 is connected to the second input terminal 321, a scanning signal SI is provided to the third input terminal 322, a selection signal SE is provided to the selection terminal 324 of the selection circuit 32, and a clock signal CK is provided to the clock terminal 342.

In the embodiment of FIG. 3, the register circuit 34 can be a flip-flop (FF), the selection circuit 32 can be a multiplexer (mux), and the logic gate 30 can be a NAND gate. However, the above are only examples, and the present disclosure is not limited thereto. The logic gate 30 can also be, for example, an AND gate, an OR gate, a NOT gate, a NOR gate, or an XOR gate that implement other digital logics.

In addition, the so-called topology mapping is to first find a physical layout file from the standard cell library file, for example, the physical layout file can be Verilog file that utilizes circuit description language netlist (e.g., Verilog's netlist) to describe signal connection relationship between individual standard cells, and then find out relevant descriptions of a name of a circuit element (or circuit module) and signals, signal directions and pins that are related to the circuit element from the physical layout file, so as to identify the target sequential cell 3 having the logic gate 30, the selection circuit 32 and the register circuit 34 from circuit structures of the standard cells.

Step S22: for each of the at least one target sequential cell, performing a logic test process to find at least one pin combination having a mutual non-controllable relationship between the plurality of first input terminals and the selection terminal. In some embodiments, the logic test process 102 can be implemented in a form of software, such as a computer program, and can be stored in the memory 10.

Figure 4:
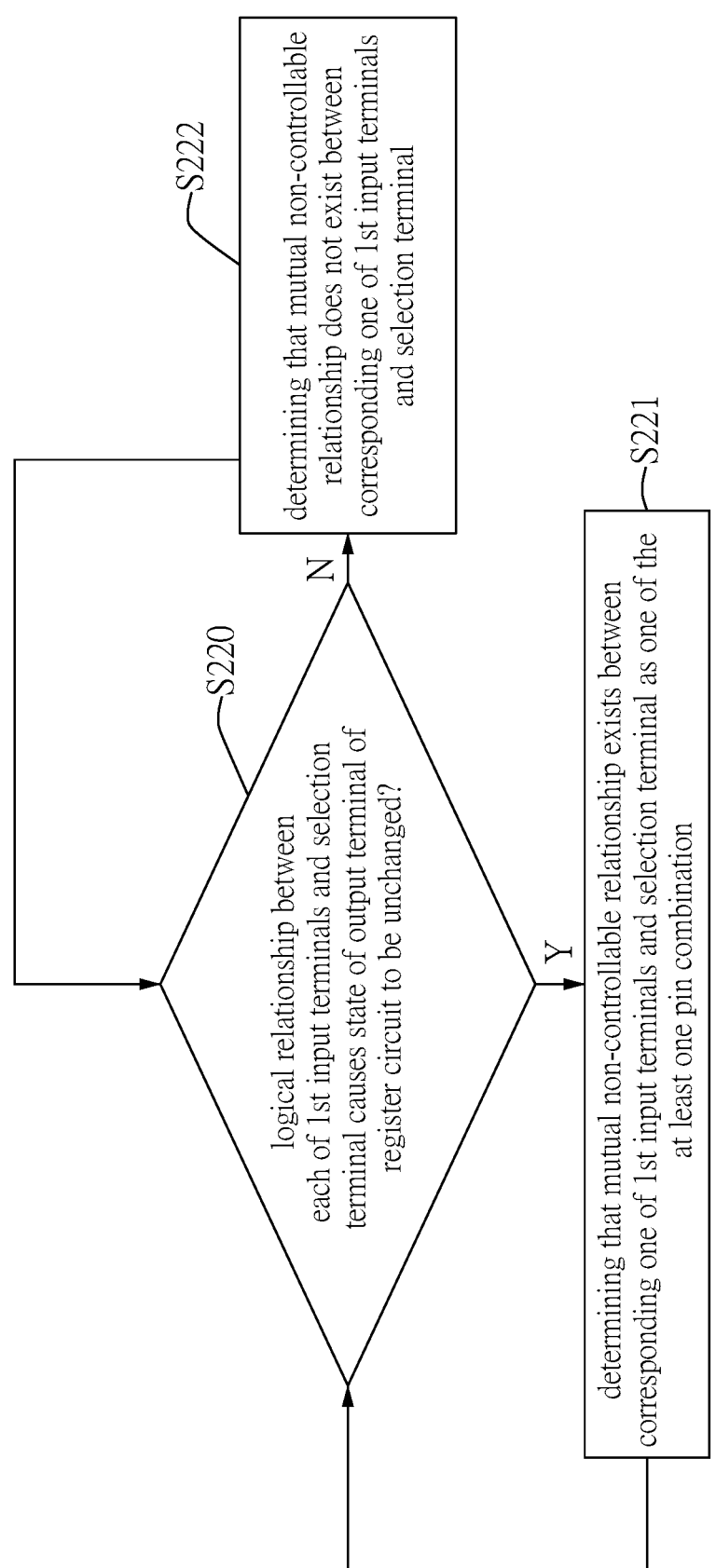
FIG. 4 is a flowchart of a logic test process according to one embodiment of the present disclosure.

Reference can be further made to FIG. 4, which is a flowchart of a logic test process according to one embodiment of the present disclosure. The logic test process includes the following steps:

Step S220: determining whether or not a logical relationship between each of the first input terminals and the selection terminal causes a state of an output terminal of the register circuit to be unchanged.

In this step, for example, a test signal group can be input to the first input terminals 301 to 30*n* and the selection terminal 324 in a simulation manner, so as to determine whether or not an output signal Q of the output terminal out of the register circuit 34 changes is determined. In an alternative embodiment, the determination of step S220 can be made directly according to the circuit structure of the at least one target sequential cell, while the simulation manner in which the test signal group is input can be omitted, but the present disclosure is not limited thereto.

It should be noted that, in the embodiment of FIG. 3, in response to the selection signal SE being at the first level, such as a high level, the selection circuit 32 can select the second input terminal 321 to output a signal received by the second input terminal 321 to the second output terminal 321.

In response to the selection signal SE being at the second level, such as a low level, the selection circuit 32 can select the third input terminal 322 to output the scan signal SI received by the third input terminal 321 to the second output terminal 321. However, the present disclosure is not limited thereto, and in other embodiments, the first level can also be a low level, and the second level can also be a high level.

Therefore, when the selection signal SE is at the second level, no matter what signal combination is input to the first input terminals 301 to 30*n*, the output signal Q of the output terminal out remains unchanged, and the output signal Q is only related to the scan signal SI. In other words, the existence of the non-controllable relationship between each of the first input terminal (i.e., first input terminal 301, 302, . . . , or 30*n*) and the selection terminal 324 can be demonstrated thusly.

In response to determining that the logical relationship causes a state of the output terminal out of the register circuit 34 to be unchanged, the logic test process proceeds to step S221: determining that the mutual non-controllable relationship exists between a corresponding one of the first input terminals and the selection terminal, and using the corresponding one of the first input terminals and the selection terminal as one of the at least one pin combination. For example, when the selection signal SE of the selection terminal 324 is the low level, the first input terminal 301 and the selection terminal 324 are a combination of pins that has the mutual non-controllable relationship.

In response to determining that the logical relationship causes the state of the output terminal out of the register circuit 34 to be changed, the logic test process proceeds to step S222: determining that the mutual non-controllable relationship does not exist between the corresponding one of the first input terminals and the selection terminal. The logic test process then returns to step S220 to perform the determination on a next one of the first terminals.

The static timing analysis method proceeds to step S23: according to the obtained at least one pin combination, taking the timing constraints related to the at least one pin combination in the standard cell library file to serve as redundant timing constraints, and removing the redundant timing constraints from the standard cell library file, so as to generate an optimized standard cell library file.

For example, when the selection signal SE of the selection terminal 324 is the low level, timing constraints related to the first input terminal 301 and the selection terminal 324 are regarded as removable redundant timing constraints, and the standard cell library file 101 can be modified accordingly.

Step S24: performing a static timing analysis on a target circuit design according to the optimized standard cell library file to obtain data of a critical path of the target circuit design.

Those skilled in the art should understand that the static timing analysis is a workflow used to calculate and predict timings of digital circuits during the circuit design process, so as to measure delays of the circuit in different working stages, and to test an operational capability of the circuit at a specified frequency.

For example, in the embodiments of the present disclosure, the target circuit design can be described by a circuit design description file 105, and the target circuit design can include a plurality of signal transmission paths. Therefore, after the static timing analysis is performed, for example, by using the processor 11 to execute a static timing analysis (STA) tool 103, and the target circuit is analyzed according to the optimized standard cell library file 101, a path causing the largest signal transmission delay among the signal transmission paths is regarded as a critical path. In this step, relevant information of the critical path is obtained by simulation and serve as a timing analysis result 104, which can be stored in the memory 10.

Beneficial Effects of the Embodiments

In conclusion, in the static timing analysis method and the static timing analysis system provided by the present disclosure, circuit elements that need to be corrected due to the redundant timing constraints in previous circuit designs can be effectively found, thereby reducing erroneous detection and repetitive modifications to the circuit designs, thus speeding up a development schedule while providing high reliability and high efficiency.

In addition, a reduction in the performance, power consumption and area (PPA) caused by corrections performed for the redundant timing constraints can be avoided, and costs associated with corrections to the chip design can be saved.

On the other hand, the optimized standard cell library obtained after removing the redundant timing constraints can be available to all circuit designs using the same standard cell library for reuse, making data thereof reusable.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A static timing analysis method, comprising:

obtaining a standard cell library file describing a plurality of standard cells, wherein the standard cell library file defines a plurality of timing constraints associated with the plurality of standard cells;

performing topology mapping on the standard cell library file to find at least one target sequential cell from the plurality of standard cells, wherein each of the at least one target sequential cell includes a logic gate, a selection circuit and a register circuit, the logic gate has a plurality of first input terminals, and the selection circuit has a selection terminal;

for each of the at least one target sequential cell, performing a logic test process to find at least one pin combination having a mutual non-controllable relationship between the plurality of first input terminals and the selection terminal;

according to the obtained at least one pin combination, taking the timing constraints related to the at least one pin combination in the standard cell library file to serve as redundant timing constraints, and removing the redundant timing constraints from the standard cell library file, so as to generate an optimized standard cell library file; and performing a static timing analysis on a target circuit design according to the optimized standard cell library file to obtain data of a critical path of the target circuit design.

2. The static timing analysis method according to claim 1, wherein the logic test process includes determining whether or not a logical relationship between each of the first input terminals and the selection terminal causes a state of an output terminal of the register circuit to be unchanged.

3. The static timing analysis method according to claim 2, further comprising: in response to determining that the logical relationship causes the state of the output terminal of the register circuit to be unchanged, determining that the mutual non-controllable relationship exists between a corresponding one of the first input terminals and the selection terminal, and using the corresponding one of the first input terminals and the selection terminal as one of the at least one pin combination.

4. The static timing analysis method according to claim 2, wherein the logic test process further includes: inputting a test signal group into the plurality of first input terminals and the selection terminal, and determining whether or not an output signal of the output terminal of the register circuit changes.

5. The static timing analysis method according to claim 2, wherein, in the at least one target sequential cell, the logic gate further has a first output terminal, and the selection circuit further has a second input terminal, a third input terminal and a second output terminal, the register circuit has a fourth input terminal and a clock terminal, the first output terminal is connected to the second input terminal, a selection signal is provided to the selection terminal, the second output terminal is connected to the fourth input terminal, and a clock signal is provided to the clock terminal.

6. The static timing analysis method of claim 5, wherein in response to the selection signal being at a first level, the selection circuit selects the second input terminal, and in response to the selection signal being at a second level, the selection circuit selects the third input terminal.

7. The static timing analysis method according to claim 6, wherein, in response to the selection signal being at the second level, the non-mutually controllable relationship exists between the first input terminals and the selection terminal.

8. The static timing analysis method according to claim 1, wherein the register circuit is a flip-flop (FF), and the selection circuit is a multiplexer.

9. A timing analysis system for an integrated circuit layout, the timing analysis system comprising:

a memory configured to store a plurality of computer-executable instructions; and a processor electrically coupled to the memory and configured to retrieve and execute the plurality of computer-executable instructions to execute a static timing analysis method, wherein the static timing analysis method includes:

obtaining a standard cell library file describing a plurality of standard cells, wherein the standard cell library file defines a plurality of timing constraints associated with the plurality of standard cells;

performing topology mapping on the standard cell library file to find at least one target sequential cell from the plurality of standard cells, wherein each of the at least one target sequential cell includes a logic gate, a selection circuit and a register circuit, the logic gate has a plurality of first input terminals, and the selection circuit has a selection terminal;

for each of the at least one target sequential cell, performing a logic test process to find at least one pin combination having a mutual non-controllable relationship between the plurality of first input terminals and the selection terminal;

according to the obtained at least one pin combination, taking the timing constraints related to the at least one pin combination in the standard cell library file to serve as redundant timing constraints, and removing the redundant timing constraints from the standard cell library file, so as to generate an optimized standard cell library file; and performing a static timing analysis on a target circuit design according to the optimized standard cell library file to obtain data of a critical path of the target circuit design.

10. The static timing analysis system according to claim 9, wherein the logic test process includes determining whether or not a logical relationship between each of the first input terminals and the selection terminal causes a state of an output terminal of the register circuit to be unchanged.

11. The static timing analysis system according to claim 10, wherein, in response to determining that the logical relationship causes the state of the output terminal of the register circuit to be unchanged, it is determined that the mutual non-controllable relationship exists between a corresponding one of the first input terminals and the selection terminal, and the corresponding one of the first input terminals and the selection terminal are used as one of the at least one pin combination.

12. The static timing analysis system according to claim 10, wherein the logic test process further includes: inputting a test signal group into the plurality of first input terminals and the selection terminal, and determining whether or not an output signal of the output terminal of the register circuit changes.

13. The static timing analysis system according to claim 10, wherein, in the at least one target sequential cell, the logic gate further has a first output terminal, and the selection circuit further has a second input terminal, a third input terminal and a second output terminal, the register circuit has a fourth input terminal and a clock terminal, the first output terminal is connected to the second input terminal, a selection signal is provided to the selection terminal, the second output terminal is connected to the fourth input terminal, and a clock signal is provided to the clock terminal.

14. The static timing analysis system of claim 13, wherein in response to the selection signal being at a first level, the selection circuit selects the second input terminal, and in response to the selection signal being at a second level, the selection circuit selects the third input terminal.

15. The static timing analysis system according to claim 14, wherein, in response to the selection signal being at the second level, the non-mutually controllable relationship exists between the first input terminals and the selection terminal.

16. The static timing analysis system according to claim 9, wherein the register circuit is a flip-flop (FF), and the selection circuit is a multiplexer.

* * * * *